US006931659B1

(12) United States Patent
Kinemura (10) Patent No.: US 6,931,659 B1
(45) Date of Patent: Aug. 16, 2005

(54) CABLE MODEM HAVING A WIRELESS COMMUNICATION FUNCTION

(75) Inventor: Hiroshi Kinemura, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 449 days.

(21) Appl. No.: 09/629,339

(22) Filed: Aug. 1, 2000

(30) Foreign Application Priority Data

Aug. 5, 1999 (JP) .............................. H11-222576

(51) Int. Cl.[7] .......................... H04N 7/173; H04Q 7/00; H04J 1/00; H04L 5/16
(52) U.S. Cl. .......................... 725/111; 725/81; 725/107; 725/124; 725/125; 370/252; 370/332; 370/333; 370/338; 370/419; 370/487; 375/222
(58) Field of Search ...................... 725/111, 78, 80–82, 725/107, 124, 125; 370/332–333, 252, 338, 370/419, 463, 485–486; 375/222

(56) References Cited

U.S. PATENT DOCUMENTS

| 4,816,825 A | * | 3/1989 | Chan et al. ............... 340/825.5 |
| 5,054,034 A | * | 10/1991 | Hughes-Hartogs .......... 375/222 |
| 5,101,499 A | * | 3/1992 | Streck et al. .................. 455/4 |
| 5,155,590 A | * | 10/1992 | Beyers, II et al. ............ 358/86 |
| 5,327,576 A | * | 7/1994 | Uddenfeldt et al. ........ 370/333 |
| 5,602,869 A | * | 2/1997 | Scott .......................... 375/222 |
| 5,606,725 A | * | 2/1997 | Hart ............................ 725/131 |
| 5,669,066 A | * | 9/1997 | Borg et al. .................... 455/69 |
| 5,708,961 A | * | 1/1998 | Hylton et al. ................. 725/81 |
| 5,710,981 A | * | 1/1998 | Kim et al. ..................... 455/69 |
| 5,748,443 A | * | 5/1998 | Flint et al. ................... 361/686 |
| 5,790,806 A | * | 8/1998 | Koperda ................. 395/200.82 |
| 5,822,307 A | * | 10/1998 | Eastmond et al. .......... 370/278 |
| 5,825,761 A |   | 10/1998 | Tanaka et al. |
| 5,903,548 A | * | 5/1999 | Delamater ................... 370/310 |
| 5,907,801 A | * | 5/1999 | Albert et al. ................ 455/406 |
| 5,982,363 A | * | 11/1999 | Naiff ........................... 345/721 |
| 6,075,972 A | * | 6/2000 | Laubach et al. ............. 455/5.1 |
| 6,097,732 A | * | 8/2000 | Jung ........................... 370/466 |

(Continued)

FOREIGN PATENT DOCUMENTS

EP          0 766 490 A2     4/1997

(Continued)

OTHER PUBLICATIONS

Mohri, "Method To Generate a Large Number of Slow Positrons with a Modular Photon-Positron Converter", Japanese Journal of Applied Physics, Publication Office Japanese Journal of Applied Physics, Tokyo, JP, vol. 30, No. 5B Part 2, May 15, 1991, pp. L936-L939.

(Continued)

*Primary Examiner*—Hai Tran
*Assistant Examiner*—Son P. Huynh
(74) *Attorney, Agent, or Firm*—David G. Conlin; William J. Daley, Jr.; Edwards & Angell, LLP (57) ABSTRACT

A cable modem uses a CATV network as an information transfer medium. To a cable modem proper that is connected by way of a coaxial cable to a CATV network, an expansion unit is attached that has a wireless LAN function that permits wireless communication with an information processing terminal. The expansion unit is removably attached to the cable modem proper by use of a plug and connector.

4 Claims, 7 Drawing Sheets

U.S. PATENT DOCUMENTS

| | | | |
|---|---|---|---|
| 6,169,569 B1 * | 1/2001 | Widmer et al. | 348/11 |
| 6,259,891 B1 * | 7/2001 | Allen | 455/3.02 |
| 6,377,981 B1 * | 4/2002 | Ollikainen et al. | 709/217 |
| 6,404,776 B1 * | 6/2002 | Voois et al. | 370/486 |
| 6,469,681 B1 * | 10/2002 | Jones et al. | 343/906 |
| 6,493,875 B1 * | 12/2002 | Eames et al. | 725/81 |
| 6,496,105 B2 * | 12/2002 | Fisher et al. | 340/310.01 |
| 6,529,743 B1 * | 3/2003 | Thompson et al. | 455/557 |
| 6,539,205 B1 * | 3/2003 | Wan et al. | 370/465 |
| 6,570,974 B1 * | 5/2003 | Gerszberg et al. | 379/218.01 |
| 2003/0043771 A1 * | 3/2003 | Mizutani et al. | 370/338 |

FOREIGN PATENT DOCUMENTS

| | | |
|---|---|---|
| EP | 0 862 294 A2 | 9/1998 |
| JP | 02149137 | 6/1990 |
| JP | 10-234028 | 9/1998 |

OTHER PUBLICATIONS

XP-002089200, "The GXM System", pp. 342-346.

* cited by examiner

| TERMINAL IP | RATE | CABLE MODEM OUTPUT | CPE OUTPUT |
|---|---|---|---|
| 1××、○△△、□□、01 | 4800 | 5 | 5 |
| 02 | 9600 | 4 | 4 |
| 03 | 9600 | 3 | 3 |
| ⋮ | ⋮ | ⋮ | ⋮ |

FIG.6

1ST MAC { IEEE 802.2/DIX LLC, Linc Security, MAC, RF-MAC }
Ex:52~806MHz CABLE-NETWORK

2ND MAC { LLC, SS-MAC, SS-PHY }
Wireless Network

CABLE MODEM HAVING A WIRELESS COMMUNICATION FUNCTION

BACKGROUND OF THE INVENTION

1. Field of the Invention

The present invention relates to a cable modem that exchanges information by using a CATV network as an information transfer medium.

2. Description of the Prior Art

Figure 9:
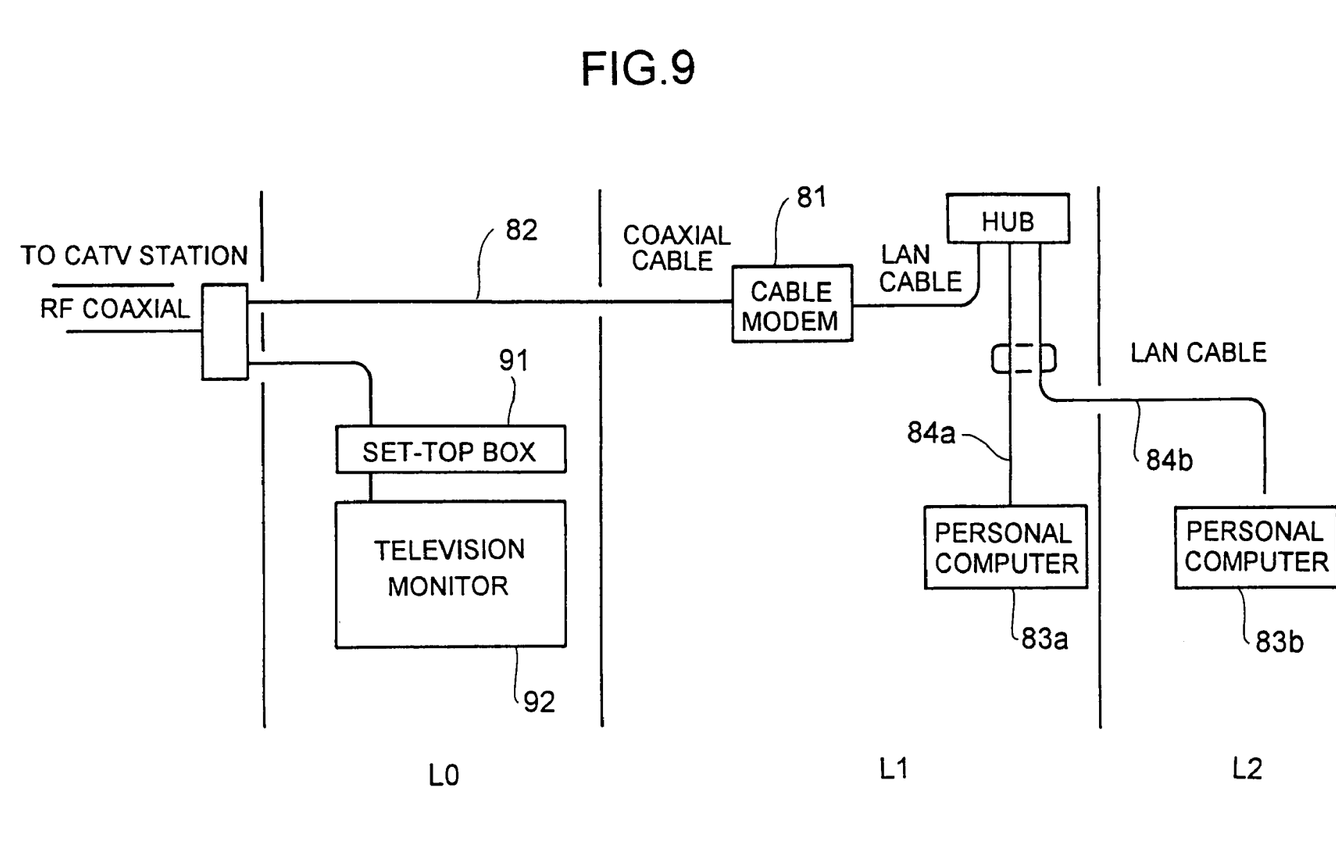
FIG. 9 is a diagram showing the construction of a network system employing a conventional cable modem.

An example of a conventional cable modem is shown in FIG. 9. This cable modem 81 is, on the one hand, connected by way of a 75 Ω coaxial cable 82 to a CATV station (head end) of a CATV network (not shown), and, on the other hand, connected by way of cables 84a, 84b, ..., such as a LAN cable and a USB (universal serial bus) cable, to an information processing terminals 83a, 83b, ..., such as personal computers (this system will be referred to as conventional system 1). In FIG. 9, reference numeral 91 represents a set-top box connected to an RF coaxial cable 100, and reference numeral 92 represents a television monitor connected to the set-top box. Reference symbol LO represents a living room, and reference symbols L1 and L2 represent other rooms separate therefrom.

On the other hand, for example, Japanese Patent Application Laid-Open No. H10-234028 discloses a cable modem (CATV home unit) provided with a CATV data transmission/reception unit and a wireless LAN unit. Here, the CATV data transmission/reception unit is connected by way of a CATV cable to a CATV network, and is connected to individual information processing terminals through wireless communication by the wireless LAN unit (this system will be referred to as conventional system 2).

However, with the cable modem of conventional system 1 described above, which is based on wired communication, the connection between the cable modem 81 and information processing terminals 83a, 83b, ..., such as personal computers, requires installation of cables 84a, 84b, ..., such as a LAN cable and a USB cable. In particular in cases where the cable modem 81 is installed in a room separate from the rooms in which the information processing terminals 83a, 83b, ... are installed, installation of the cables requires large-scale work.

On the other hand, switching from wired communication as employed by conventional system 1 described above to wireless communication as employed by conventional system 2 described above requires replacement of the cable modem itself, and thus requires extra costs.

SUMMARY OF THE INVENTION

An object of the present invention is to provide a cable modem having a wireless communication function that permits easy and inexpensive switching from wired communication to wireless communication.

To achieve the above object, according to one aspect of the present invention, a cable modem having a wireless communication function and using a CATV network as an information transfer medium is provided with a cable modem proper that is connected by way of a coaxial cable to a CATV network and an expansion unit attached thereto having a wireless LAN function that permits communication with an information processing terminal on a wireless basis. Here, this expansion unit and the cable modem proper are coupled together by use of a plug and a connector in such a way as to be freely removable. This permits easy switching from wired communication to wireless communication.

According to another aspect of the present invention, in this cable modem configured as described above, the plug is a plug for a LAN cable and the connector is a connector for a LAN cable. This permits easy switching from wired communication to wireless communication.

According to another aspect of the present invention, in the cable modem configured as described above, the bit error rate of the expansion unit is measured at regular time intervals so that the output level and the data transfer rate are varied according to the measurement results in order to keep communication quality above a predetermined level. In a case where a wireless network is used for communication with an information processing terminal, there is the risk of poor communication quality depending on the location of the information processing terminal. Even in such a case, this configuration makes it possible to keep communication quality above a predetermined level all the time.

According to another aspect of the present invention, in the cable modem configured as described above, the cable modem has a function of transmitting information on how much to increase or decrease the output level according to the measurement results to an interface portion of the information processing terminal that communicates with the cable modem on a wireless basis. This permits the output level and the data transfer rate to be adjusted also in the interface portion of the information processing terminal, and thereby makes it possible to keep communication quality above a predetermined level all the time also on the part of the information processing terminal. That is, by adjusting the output level and the data transfer rate in both the cable modem and the interface portion of the information processing terminal, it is possible to keep communication quality above a predetermined level.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
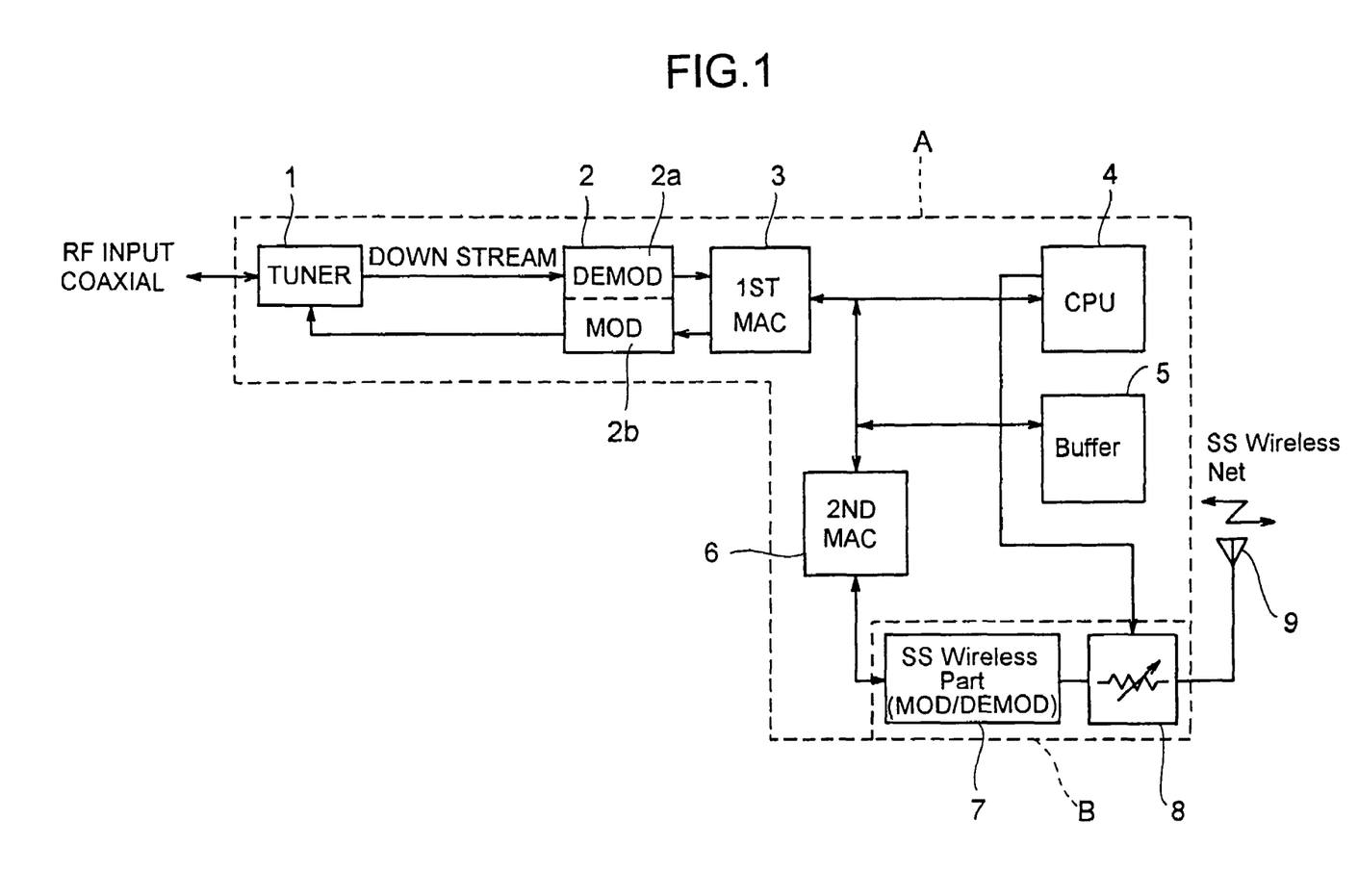
FIG. 1 is a block diagram showing the system configuration of a cable modem having a wireless communication function according to the invention.
Figure 2:
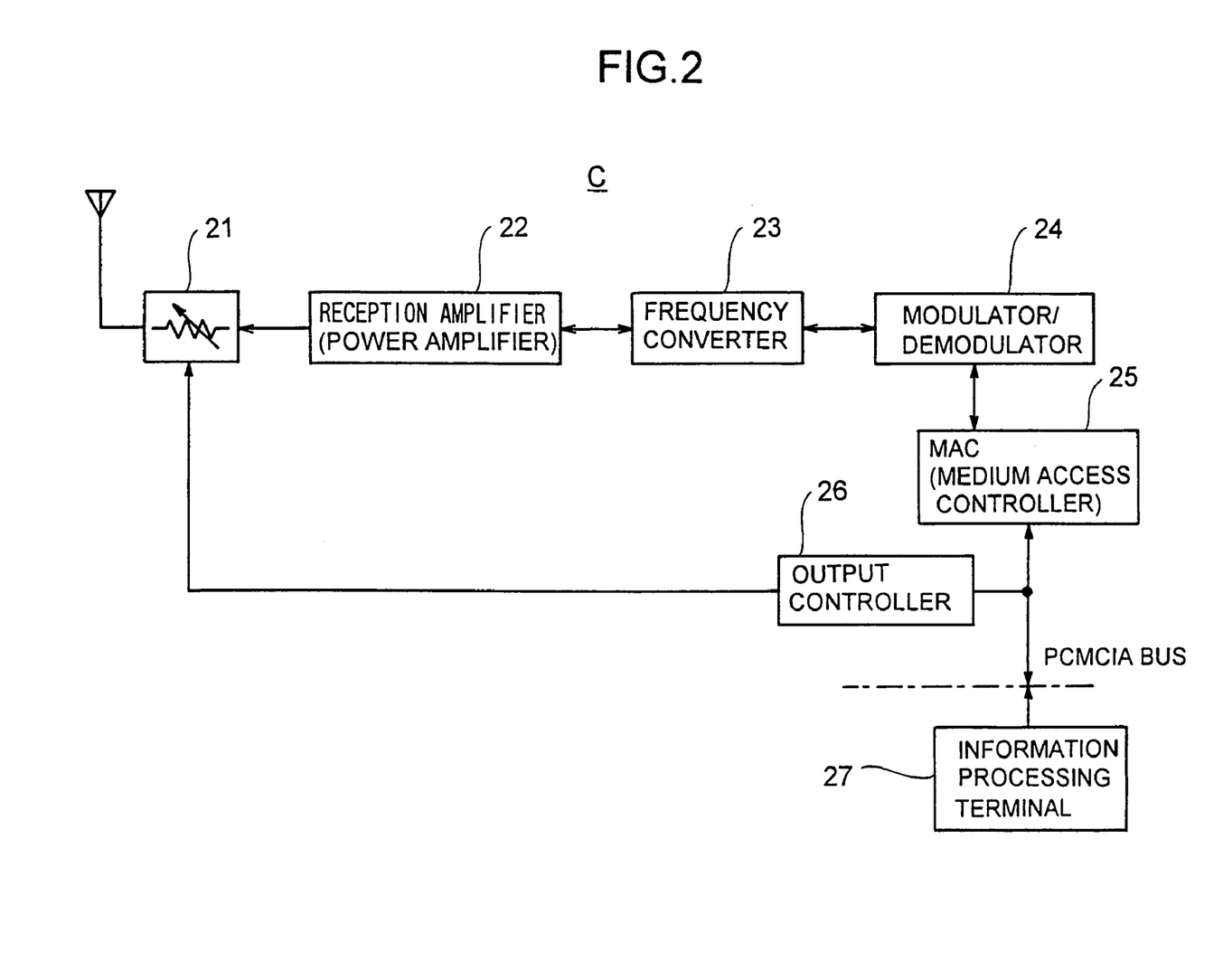
FIG. 2 is a block diagram showing the configuration of the interface portion attached to the information processing terminal.

Hereinafter, embodiments of the present invention will be described with reference to the drawings. FIG. 1 is a block diagram showing the system configuration of a cable modem having a wireless communication function according to the invention. FIG. 2 is a block diagram showing the configuration of the interface portion attached to an information processing terminal.

In this embodiment, as shown in FIG. 1, the cable modem is composed of a cable modem proper A and an expansion unit B. The cable modem proper A includes a tuner 1, a CATV-side modulator/demodulator 2 (a DEMOD (demodulator) 2a and a MOD (modulator) 2b), a first MAC (medium access controller) 3, a CPU 4, a buffer 5, and a second MAC. The expansion unit B includes an SS wireless part 7 that performs modulation/demodulation and frequency conversion on the wireless side, an output level adjuster 8, and an antenna 9. On the other hand, as shown in FIG. 2, the interface portion C attached to the information processing terminal 27 includes an output level adjuster 21, a reception amplifier (power amplifier) 22, a frequency converter 23, a modulator/demodulator 24, a MAC 25, and an output controller 26.

The tuner 1 selects information received from a CATV network, converts it into a demodulatable intermediate frequency, and feeds it to the demodulator 2a. The tuner 1 also incorporates a filter through which it transmits a modulated signal to the CATV network. Thus, through this filter, the tuner 1 sends out information fed from the modulator 2b to the CATV network, and takes in information from the CATV network into the cable modem.

The DEMOD (demodulator) 2a demodulates the intermediate-frequency output, generally QAM-modulated, fed from the tuner 1 and converts it into data packets, which are then fed to the first MAC 3. On the other hand, the MOD (modulator) 2b modulates the output of the first MAC 3 (i.e. information to be transmitted to the CATV network), generally into a QPSK signal format, and feeds it to the tuner 1.

The first MAC 3 classifies, or categorizes, information from the CATV network and information from a subscriber (end user) into signals to be processed inside the cable modem and signals to be transmitted to the subscriber or to the CATV network. The first MAC 3 also adds and removes headers and footers to and from data packets, i.e. packets of information, so as to convert the format of data packets.

Figure 4:
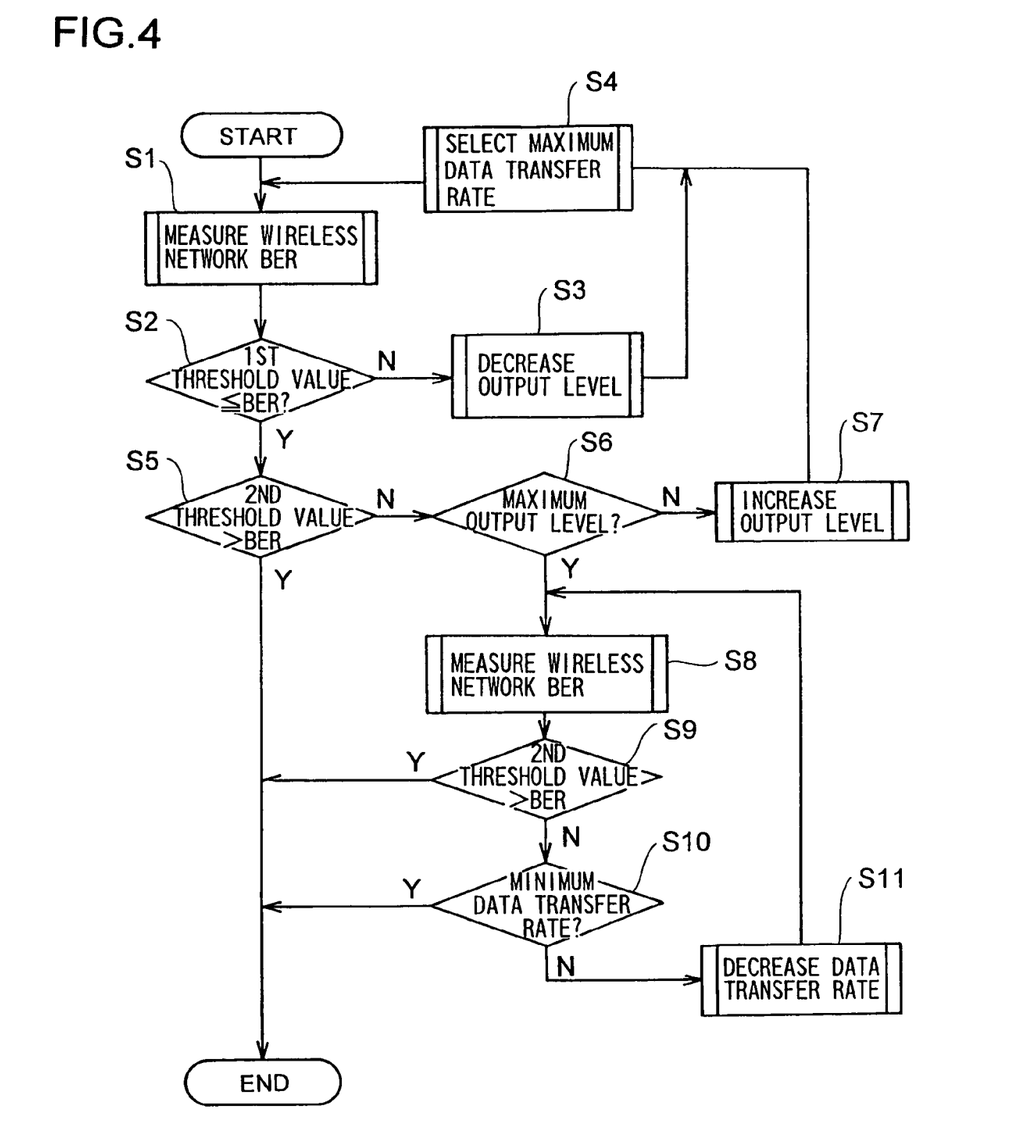
FIG. 4 is a flow chart showing the procedure for adjusting the output level and the data transfer rate.

The CPU 4 controls the direction and timing in and with which to output information, and stores the information to be output temporarily in the buffer 5. Moreover, actually using the wireless-side network, the CPU 4 measures the BER (bit error rate) and, according to the thus measured BER, feeds the output level adjuster 8 of the expansion unit B with a signal that instructs it to increase or decrease the output level on the wireless side. This signal, requesting an increase or decrease in the output level, is also transmitted through the wireless circuit of the expansion unit B to the interface portion C (see FIG. 2) of a subscriber. On the basis of this signal, the interface portion C of the subscriber adjusts, through the output controller 26, the output level of the output level adjuster 21. However, when continuous communication cannot be secured, the user is allowed to manually reset the output level to the maximum level. Similarly, also with respect to the data transfer rate, it is possible, by measuring the BER, to increase or decrease the data transfer rate according to the measured BER. For example, such adjustment of the output level and the data transfer rate is achieved by a procedure as shown in FIG. 4.

Specifically, first, the BER on the wireless network side is measured (step S1), and whether the measured BER value is equal to or greater than a first predetermined threshold value or not is checked (step S2). If the BER value is smaller than the first threshold value (i.e. if the check in step S2 results in "no"), a signal requesting a decrease in the output level is fed to the output level adjuster 8 of the expansion unit B to decrease the output level (step S3), and the data transfer rate is set at the maximum value (step S4).

On the other hand, if the BER value is equal to or greater than the first threshold value (i.e. if the check in step S2 results in "yes"), then whether the BER value is smaller than a second predetermined threshold value (here, the second threshold value>the first threshold value) or not is checked (step S5). If the BER value is smaller than the second threshold value (i.e. if the check in step S5 results in "yes"), the current output level is judged to be adequate, and the procedure is ended without outputting a signal.

On the other hand, if the BER value is equal to or greater than the second threshold value (i.e. if the check in step S5 results in "no"), then whether the output level of the output level adjuster 8 has already reached the upper limit or not is checked (step S6). If the output level has not reached the upper limit (i.e. if the check in step S6 results in "no"), a signal requesting an increase in the output level is fed to the output level adjuster 8 of the expansion unit B to increase the output level (step S7), and the data transfer rate is set at the maximum value (step S4).

In contrast, if, in step 6, the output level is found to have reached the upper limit (i.e. if the check in step S6 results in "yes"), the BER on the wireless network side is measured again (step 8), and whether the measured BER value is smaller than the second threshold value or not is checked again (step S9). If the BER value is smaller than the second threshold value (i.e. if the check in step S9 results in "yes"), the output level is judged to be adequate, and the procedure is ended without outputting a signal.

On the other hand, if the BER value is equal to or greater than the second threshold value (i.e. if the check in step S9 results in "no"), then whether the data transfer rate at that time is at the minimum value or not is checked (step S10). If the data transfer rate is at the minimum value, the procedure is ended. On the other hand, if the data transfer rate is not at the minimum value (i.e. if the check in step S10 results in "no"), the data transfer rate is further decreased (step S11), and then the procedure returns to step S8. Thereafter, the operations in steps S8 to S11 are repeated.

Figure 5:
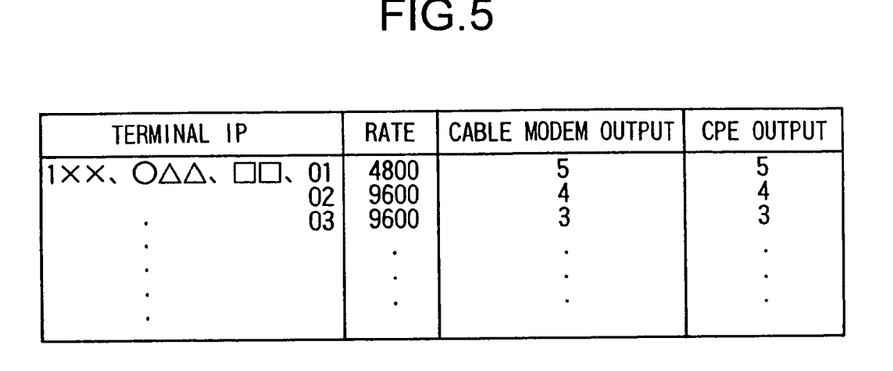
FIG. 5 is a diagram showing the construction of the management table in a case where a plurality of information processing terminals are connected by a wireless network.

Here, in a case where a plurality of information processing terminals are connected by the wireless network, for example, a management table as shown in FIG. 5 is referred to and the output level and the data transfer rate are adjusted independently for each information processing terminal. In FIG. 5, "CPE" denotes "customer premises equipment" (equipment installed on a user's premises), which is a term used in the standards (MCNS) for cable modems.

The output level and the data transfer rate are adjusted in the manner described above.

The second MAC 6 converts and classifies data on the wireless side, and also exchanges data between the cable modem proper and the SS wireless part 7. In this embodiment, IP-conforming data packets are used, and therefore, with respect to data security, it is possible to use conventional security techniques, such as those using a public or secret key, as they are.

The SS wireless part 7 performs modulation for transmission and demodulation for reception on the wireless side. With respect to this SS wireless part 7, it is possible to readily utilize the modulation/demodulation techniques used in conventional wireless modems.

Figure 3:
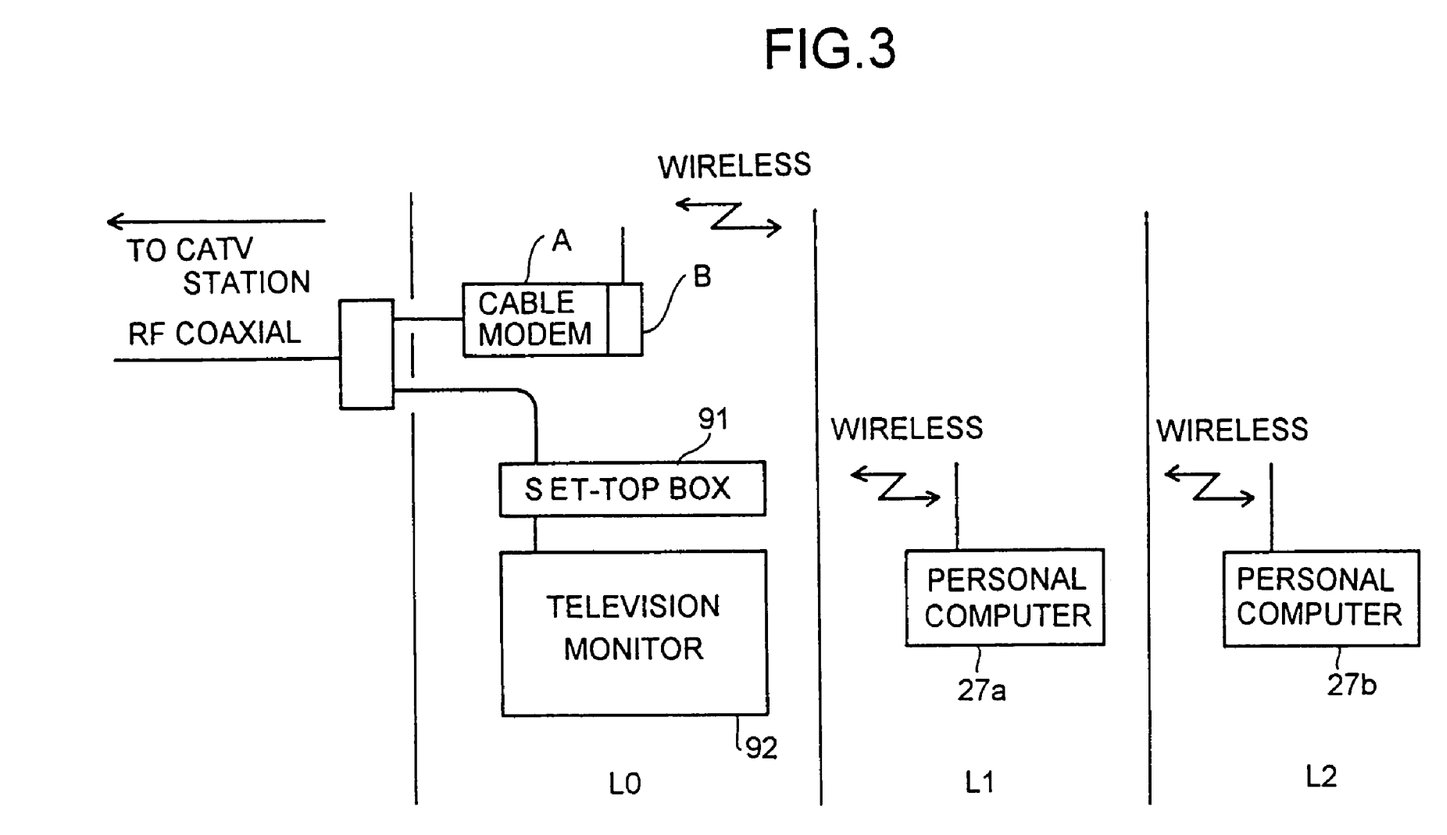
FIG. 3 is a diagram showing an example of the construction of a network system employing a cable modem according to the invention.
Figure 6:
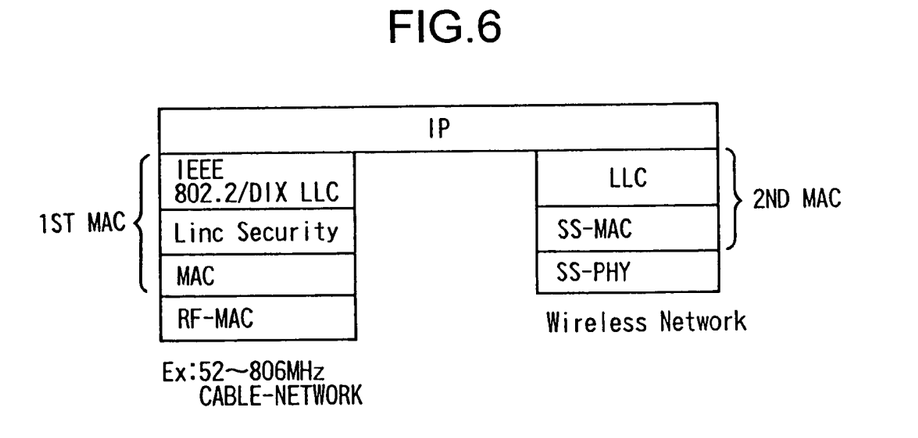
FIG. 6 is a protocol stack diagram showing the data conversion processes in the first and second MACs.

FIG. 6 is a protocol stack diagram showing the data conversion processes in the first and second MACs 3 and 6. FIG. 3 shows an example of the construction of a network system employing a cable modem according to the present invention. The features of this construction will be clear if compared with the conventional example shown in FIG. 9. In FIG. 9, reference numeral 91 represents a set-top box, reference numeral 92 represents a television monitor, and 27a and 27b represent personal computers.

In this embodiment, the information that the cable modem has received from the CATV network is first demodulated, and then the first MAC 3 separates the information into control information required by the cable modem itself and information to be transmitted to a subscriber's information processing terminal. At this time, if a plurality of information processing terminals exist, it is also necessary to identify to which information processing terminal to transmit information. Then, the thus separated information (the information to be transmitted to the information processing terminal) is subjected to modulation and then to frequency conversion, and is then transmitted to the information processing terminal.

On the other hand, the information that the cable modem has received from the information processing terminal through the interface portion C is demodulated, and is then, after identifying the sender by referring to the management table shown in FIG. 5, separated into messages to the cable modem itself and information to be transmitted to the CATV station (head end). This information is then modulated and send out to the CATV network.

Figure 7:
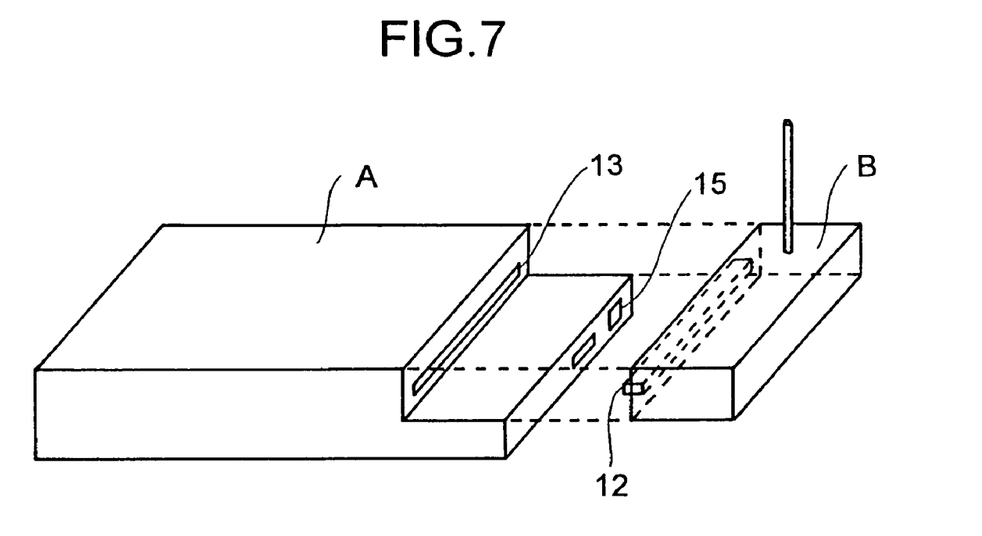
FIG. 7 is an external perspective view showing an example of the coupling mechanism between the cable modem proper and the expansion unit in a cable modem having a wireless communication function according to the invention.
Figure 8:
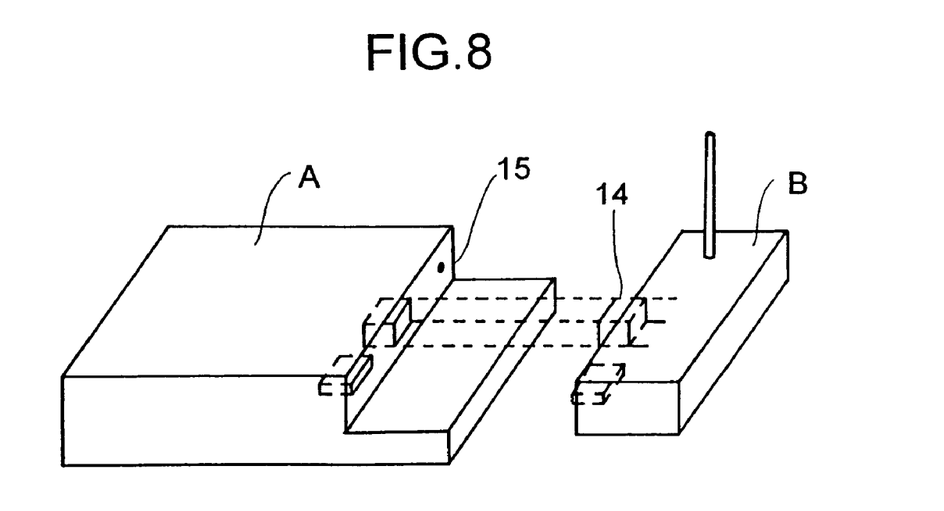
FIG. 8 is an external perspective view showing another example of the coupling mechanism between the cable modem proper and the expansion unit in a cable modem having a wireless communication function according to the invention.

FIGS. 7 and 8 are external perspective views showing examples of the coupling mechanism between the cable modem proper A and the expansion unit B of the cable modem having a wireless communication function configured as described above.

In the coupling mechanism shown in FIG. 7, a plug 13 is provided in the cable modem proper A, and a connector 12 is provided in the portion facing it of the expansion unit B, constituting as a whole a coupling mechanism of a slot-in type.

On the other hand, in the coupling mechanism shown in FIG. 8, a connector (for example, an RJ-45 jack) 15 of a LAN cable is provided in the cable modem proper A, and a plug (for example, an RJ-45 plug) 14 of a LAN cable is provided in the portion facing it of the expansion unit B. This coupling mechanism, which couples the cable modem proper A and the expansion unit B together by use of LAN connectors, permits easy switching between wired and wireless communication.

As described above, according to this embodiment, a cable modem having a wireless communication function is provided with a cable modem proper that is connected by way of a coaxial cable to a CATV network and an expansion unit attached thereto having a wireless LAN function that permits communication with an information processing terminal on a wireless basis. In addition, this expansion unit and the cable modem proper are coupled together by use of a plug and a connector in such a way as to be freely removable. This permits easy switching from wired communication to wireless communication.

Moreover, in this cable modem having a wireless communication function, the bit error rate of the expansion unit is measured at regular time intervals so that the output level and the data transfer rate are varied according to the measurement results in order to keep communication quality above a predetermined level. In a case where a wireless network is used for communication with an information processing terminal, there is the risk of poor communication quality depending on the location of the information processing terminal. Even in such a case, this configuration makes it possible to keep communication quality above a predetermined level all the time.

Moreover, in this cable modem having a wireless communication function, the cable modem has a function of transmitting information on how much to increase or decrease the output level according to the measurement results to an interface portion of the information processing terminal that communicates with the cable modem on a wireless basis. This permits the output level and the data transfer rate to be adjusted also in the interface portion of the information processing terminal, and thereby makes it possible to keep communication quality above a predetermined level all the time also on the part of the information processing terminal. That is, by adjusting the output level and the data transfer rate in both the cable modem and the interface portion of the information processing terminal, it is possible to keep communication quality above a predetermined level. Moreover, by adjusting the output level adequately, it is possible to save energy.

What is claimed is:

1. A cable modem comprising:
   a cable modem proper that is configured so as to be connected by way of a coaxial cable to a CATV network;
   an expansion unit being configured so as to have a wireless LAN function that permits communication with an information-processing terminal on a wireless basis;
   a connecting member that removably couples the cable modem proper and the expansion unit together by use of a plug and a connector; and
   wherein the cable modem proper is further configured so as to measure a BER (bit error rate) on the wireless network side, and to check whether or not a measured BER value is equal to or greater than a first threshold value, and if the measured BER value is less than the first threshold value, the cable modem proper feeds a signal to an output level adjuster of the expansion unit which signal instructs the output level adjuster of the expansion unit to decrease its output level through the connecting member and set its data transfer rate at a maximum value, then the cable modem proper restarts to measure the BER on the wireless network side;
   and if measured BER value is equal to or greater than the first threshold value, the cable modem proper compares the measured BER value with a second threshold value that is greater than the first threshold value, and if the measured BER value is smaller than the second threshold value, the cable modem proper ends its operation without changing the output level;
   and if the measured BER value is equal to or greater than the second threshold value, the cable modem proper checks whether or not the output level is at the maximum value;

and if the output level is not at the maximum value, the cable modem proper feeds a signal to the output level adjuster of the expansion unit which signal instructs the output level adjuster of the expansion unit to increase its output level through the connecting member and set its data transfer rate at a maximum value, and then the cable modem proper restarts to measure the BER on the wireless network side;

and if the output level is at the maximum value, the cable modem proper measures the BER on the wireless network side again, and compares the BER measured in such a manner with said second threshold value, and the cable modem proper ends its operation without changing the output level if the measured BER value is less than the second threshold value;

and if the measured BER value is equal to or greater than the second threshold value, the cable modem proper checks whether or not a measured data transfer rate is at a minimum value, and the cable modem proper ends its operation if the measured data transfer rate is at the minimum value;

and if the measured data transfer rate is not at the minimum value, the cable modem proper feeds a signal to an output level adjuster of the expansion unit which signal instructs the output level adjuster of the expansion unit to decrease its data transfer rate through connecting member, and measures the BER on the wireless network side again, so that an adjustment of the output level and the data transfer rate of the expansion unit is achieve.

2. A cable modem as claimed in claim 1, wherein the plug is a plug for a LAN cable, and the connector is a connector for the LAN cable.

3. A cable modem as claimed in claim 1, wherein the cable modem proper comprises a tuner, a demodulator, a modulator, a first and a second medium access controller, and a CPU, and wherein:

the tuner is arranged to select information received from the CATV network, convert the selected information into an intermediate frequency and then feed it to the demodulator, and conversely to transmit information fed from the modulator to the CATV network, the first medium access controller is arranged to classify information fed from the demodulator and information fed through the expansion unit from the information processing terminal into signals to be processed inside the cable modem and signals to be transmitted to the information processing terminal and to the CATV network, and the second medium access controller is arranged to convert and exchange data between the cable modem proper and the expansion unit.

4. A cable modem as claimed in claim 3, wherein the CPU is arranged to control direction and timing in and with which to output information.

* * * * *